United States Patent [19]

Nelson et al.

[11] Patent Number: 4,669,505
[45] Date of Patent: Jun. 2, 1987

[54] DIVERTER VALVE

[75] Inventors: George C. Nelson, Seward; Roger L. Quaintance, Henderson, both of Nebr.

[73] Assignee: Cyclonaire Corporation, Henderson, Nebr.

[21] Appl. No.: 869,130

[22] Filed: May 30, 1986

Related U.S. Application Data

[63] Continuation of Ser. No. 731,187, May 6, 1985, abandoned.

[51] Int. Cl.$^4$ .............................................. F16K 3/02
[52] U.S. Cl. .................................. 137/874; 251/159; 417/185
[58] Field of Search ................ 251/159; 137/874; 417/185

[56] References Cited

U.S. PATENT DOCUMENTS

| | | | |
|---|---|---|---|
| 905,818 | 12/1908 | Langford | 417/185 X |
| 1,017,792 | 2/1912 | O'Leary | 417/185 |
| 2,945,667 | 7/1960 | Bibbo et al. | 251/173 |
| 3,007,490 | 11/1961 | Passmore | 251/159 X |
| 3,132,669 | 5/1964 | Feldsted | 137/874 |
| 3,638,674 | 2/1972 | Forst et al. | 251/173 X |
| 3,890,991 | 6/1975 | Grove et al. | 251/159 X |
| 3,907,374 | 9/1975 | Steele | 137/874 X |
| 4,163,458 | 8/1979 | Bachmann | 251/159 X |
| 4,291,724 | 9/1981 | Miller | 137/874 X |
| 4,415,139 | 11/1983 | Potts | 251/159 X |
| 4,453,755 | 6/1984 | Blatt et al. | 417/185 X |
| 4,524,796 | 6/1985 | Ayers, Jr. et al. | 251/159 X |

FOREIGN PATENT DOCUMENTS 427446 11/1947 Italy ................................. 251/159

Primary Examiner—A. Michael Chambers
Assistant Examiner—John C. Fox
Attorney, Agent, or Firm—Welsh & Katz, Ltd.

[57] ABSTRACT

A diverter valve for use in a pneumatic conveying system includes a valve plate and a seal plate which have juxtaposed surfaces and are supported for relative movement therebetween so as to enable alignment of an input convey line port in the valve plate between alternate discharge convey line ports in the seal plate. Annular seals are supported in seal grooves circumferentially of the ports in the seal plate and are adapted for fluid pressure biasing into sealing engagement with the opposed valve plate by means of a fluid pressure control circuit. The seals are adapted to be subject to vacuum by the pressure control circuit so as to retract the seals from sealing relation with the valve plate during shifting movement of the valve plate. The seal plate and fluid pressure control circuit are further adapted to effect fluid pressure flow across the sealing surfaces of the seals during retraction thereof so as to clean the seals while in their retracted positions. The sealing arrangement substantially reduces seal wear and thereby prolongs the life of the seals, while also reducing the force required to move the valve plate to divert material flow.

11 Claims, 5 Drawing Figures

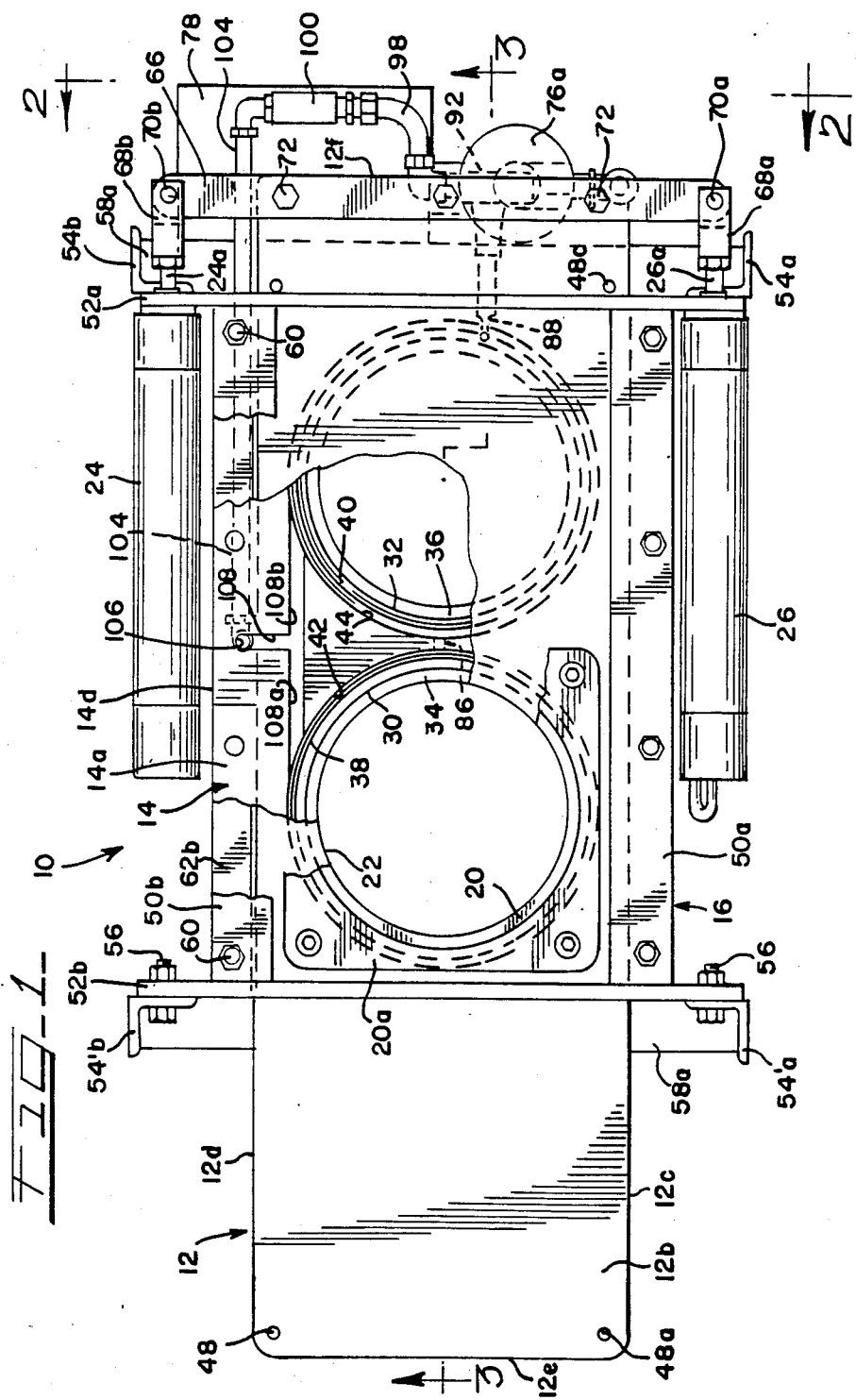

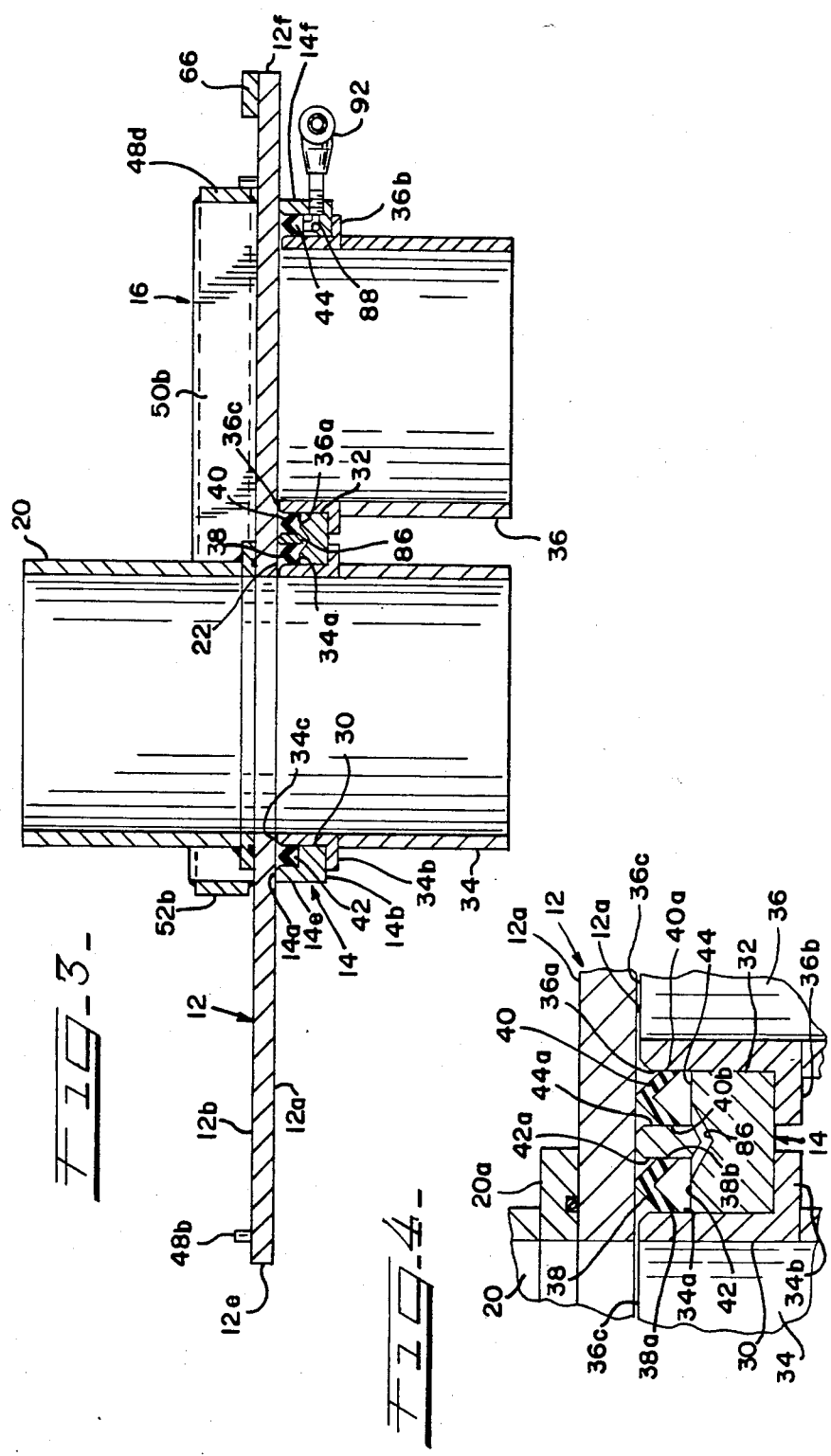

DIVERTER VALVE

This is a continuation, of application Ser. No. 731,187, filed May 6, 1985, now abandoned.

BACKGROUND OF THE INVENTION

The present invention relates generally to diverter valves for use in pneumatic conveying systems and the like, and more particularly to a diverter valve having a novel seal arrangement which provides substantially improved seal life.

It is known to employ diverter valves in pneumatic conveying systems for transferring dry flowable particulate or pulverulent materials such as cement, ash, soot, powdered minerals, flour and coal dust and the like. Such systems generally employ a transfer or pressure vessel into which the particulate material is drawn, such as from the hold of a ship or railcar or the like, and from which the flowable material is discharged by way of a pneumatic convey line or conduit to a different location such as a remote storage silo or manufacturing facility. Depending upon the volume of material being transferred, or alternatively the volume capacity of the receiving facility or receptacle, a diverter valve may be utilized in the pneumatic convey line to facilitate diversion of material flow between one or more alternate receiving convey lines for transfer to alternate storage or operating facilities.

Diverter valves of the aforementioned type are known which employ a pair of plates supported in juxtaposed relation for relative movement therebetween, and wherein one of the plates has a port adapted for connection to a pneumatic convey input line and the other plate has a pair of ports adapted for connection to corresponding output convey lines such that selective relative movement between the plates effects alternate aligned positioning of the ports and associated convey lines to facilitate flow through either of the output convey lines. To establish a sealed condition between aligned ports, it is known to provide an annular seal about the port of each output convey line for sealing against the opposed plate. The annular seals are generally biased into sealing relation with the opposed plate surface by fluid pressure or mechanical spring means.

A significant drawback in the known diverter valves of the aforedescribed type is that the annular seals undergo substantial wear during relative movement between the juxtaposed plates when shifted to divert flow between one or more alternate convey lines. It will be appreciated that the greater the force biasing a seal into sealing relation with the opposed plate, the greater the wear experienced by the seal during actuation of the valve between alternate convey conditions, thus significantly reducing the life of the seal. Another problem incident to pressurized engagement of the annular seals against the opposed valve plate surface during relative movement between the valve plates is that a greater force is required to effect movement between the valve plates, thus requiring greater energy to effect operation of the diverter valve.

SUMMARY OF THE INVENTION

One of the primary objects of the present invention is to provide a diverter valve of the type employing a pair of relatively movable juxtaposed plates one of which has a port communicating with an input convey line adapted for selective alignment with at least one port in the other plate which is adapted for connection to an output convey line, the diverter valve having a novel seal arrangement associated with the valve ports so as to provide significantly improved seal life over prior diverter valves.

A more particular object of the present invention is to provide a novel diverter valve employing a valve plate supported in juxtaposed relation to a seal plate in a manner to enable relative movement therebetween, the valve plate having a port therethrough adapted for communication with a pneumatic convey line and being selectively movable between a position aligned with a first output port through the seal plate and a diverting position aligned with a second output port in the seal plate. An annular seal is supported circumferentially of each seal plate port for sealing engagement with the opposed valve plate surface and is adapted for operative association with a fluid pressure system so as to enable the seals to be biased into sealing relation with the valve plate and subjected to vacuum to retract the seals during relative movement between the valve and seal plates whereby to substantially prolong seal life and reduce the force required to effect relative movement between the valve and seal plates.

A feature of the diverter valve in accordance with the invention lies in its adaptability for connection in a fluid pressure control circuit having a venturi selectively operable to apply pressure to the annular seals or subject the seals to vacuum so as to effect retraction of the seals from sealing engagement with the opposed valve plate whereby to prevent abrasive contact with the valve plate during movement thereof A further feature of the diverter valve in accordance with the present invention lies in the provision of means to effect fluid flow across the sealing surfaces of the annular seals when retracted from sealing engagement with the valve plate so as to effect cleaning of the seal surfaces during relative movement between the valve and seal plates.

Further objects and advantages of the present invention, together with the organization and manner of operation thereof, will become apparent from the following detailed description of the invention when taken in conjunction with the accompanying drawings wherein like reference numerals designate like elements throughout the several views.

BRIEF DESCRIPTION OF THE DRAWINGS

FIG. 1 is an elevational view of a diverter valve constructed in accordance with the present invention, portions being broken away for purposes of clarity;

FIG. 3 is a longitudinal sectional view taken substantially along line 3—3 of FIG. 1, looking in the direction of the arrows and with portions of the framework removed;

FIG. 4 is a an enlarged fragmentary detail view, on an enlarged scale, illustrating the seal rings, seal ring grooves in the seal plate and associated outlet convey lines.

DETAILED DESCRIPTION OF PREFERRED EMBODIMENT

Figure 2:
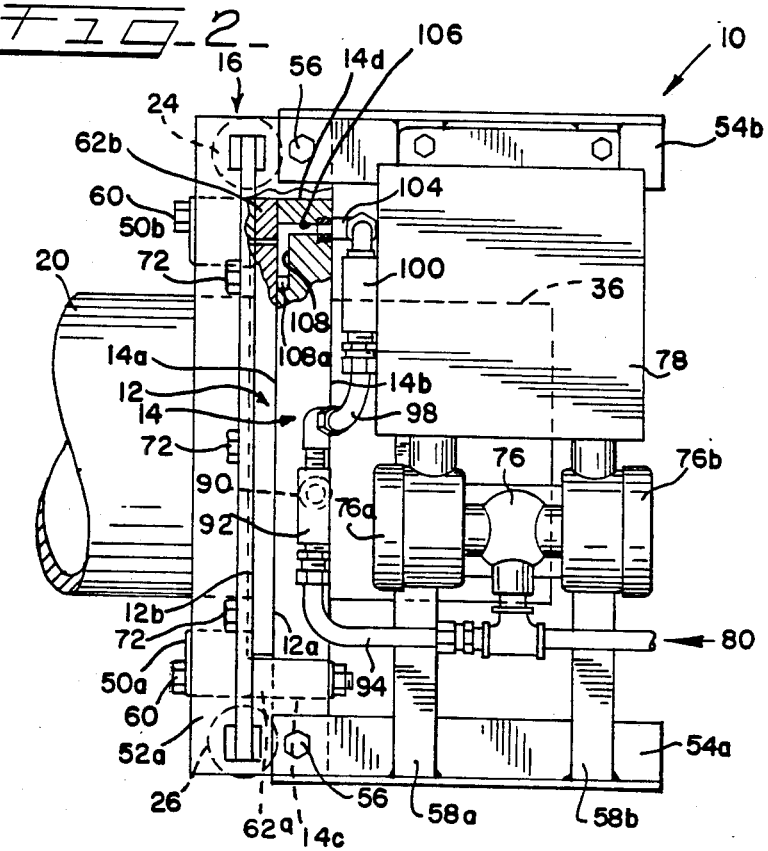
FIG. 2 is an end view of the diverter valve of FIG. 1, taken substantially along line 2—2 of FIG. 1 and looking in the direction of the arrows.

Referring now to the drawings, and in particular to FIGS. 1-3, a diverter valve constructed in accordance with the present invention is indicated generally at 10. Very generally, the diverter valve 10 includes a valve plate 12 which is supported such that a substantially planar surface 12a of the valve plate lies in juxtaposed or interfacing relation with a substantially planar surface 14a of a seal plate 14. The valve plate 12 and seal plate 14 are supported by support means 16 in the form of a support framework to which, in the illustrated embodiment, the seal plate 14 is affixed while the valve plate 12 is longitudinally movable so as to enable selective relative movement between the valve and seal plates.

The valve plate 12 has a tubular convey or flow line 20 connected thereto through a rectangular flange 20a such that line 20 communicates with a circular port 22 through the valve plate. The valve plate 12 is interconnected to actuating means in the form of a pair of double acting fluid pressure cylinders 24 and 25 which, as will be described, are connected in a fluid pressure control circuit operative to effect movement of the valve plate 12 between a first position wherein the port 22 and associated convey line 20 are axially aligned with a first circular discharge or outlet port 30 through the seal plate 14, and a second position wherein the convey line 20 is aligned with a second circular discharge port 32 through the seal plate 14. Tubular convey or flow lines 34 and 36 are supported by the seal plate 14 in communciation with the ports 30 and 32, respectively, so as to receive and convey material from the convey line 20 when aligned therewith.

Substantially identical annular non-rigid and non-metallic seals 38 and 40 are supported by the seal plate 14 within annular seal ring grooves 42 and 44, respectively, formed circumferentially about the ports 30 and 32. As will be described, the seal ring grooves 42 and 44 are interconnected in fluid pressure communication with each other and to the aforementioned fluid pressure control circuit in a manner to enable the seals 38 and 40 to be biased into sealing engagement with the opposed surface 12a of the valve plate 12 during passage of particulate material or the like from the convey line 20 through either of the convey ports 30 and 32 in the seal plate. The fluid pressure control circuit is operative to apply vacuum or negative pressure to the seals 38 and 40 so as to effect disengagement thereof from their sealing relation with the valve plate 12 during movement of the valve plate between its different material flow positions, thus substantially reducing wear on the seals with resulting improved seal life. By releasing the seals from sealing engagement with the valve plate 12, the force required to shift the valve plate is also significantly reduced.

Turning now to a more detailed description of the diverter valve 10, the valve plate 12 is made of a suitable metallic or plastic material and is generally rectangular, having a substantially planar surface 12b opposite and parallel to the planar surface 12a, longitudinal edge surfaces 12c and 12d which define the laternal marginal edges of the valve plate, and transverse end surfaces 12e and 12f. If desired, the valve plate may be metallic and have a low friction laminate layer forming the surface 12a. Two pairs of upstanding pin stops 48a,b and 48c,d are mounted on the valve plate 12 so as to extend outwardly from the planar surface 12a at opposite ends thereof as illustrated in FIG. 1. The pairs of stops 48a,b and 48c,d serve to limit the extent of movement of the valve plate relative to the support framework 16.

The seal plate 14 may also be made of a suitable metallic or plastic material and has a generally rectangular configuration having a substantially planar surface 14b opposite and parallel to the planar surface 14a, longitudinal edge surfaces 14c and 14d which define lateral marginal edges of the seal plate, and transverse end surfaces 14e and 14f. The centers of circular ports 30 and 32 lie on the longitudinal centerline of the seal plate.

The support framework 16 includes a pair of equal length longitudinally extending frame members 50a and 50b with are substantially parallel and coplanar and which, in the illustrated embodiment, are generally square in transverse cross-section. The frame members 50a,b have their opposite ends affixed, as by welding, to transverse generally C-shaped end plates 52a and 52b. Each of the end plates 52a and 52b is secured to a corresponding pair of angle members 54a,b, and 54'a,b, as through bolts 56. The corresponding pairs of angle member 54a,b and 54'a,b are maintained in rigid generally parallel relation by corresponding pairs of frame members 58a and 58b which have their opposite ends affixed to and between the corresponding angle members 54a,b, and 54'a,b as illustrated in FIG. 2. In this manner, a rigid support framework is provided for the valve and seal plates which may be oriented as illustrated in FIG. 2 or in substantially any other desired orientation. It will be understood that the support framework 16 may take alternate forms.

As illustrated in FIG. 2, the seal plate 14 has its longitudinal marginal edges secured to and supported by the longitudinal frame members 50a and 50b by a plurality of bolts 60 which also pass through elongated spacer members 62a and 62b interposed between the marginal edges of the seal plate and the associated frame members 50a,b. The spacers 62a, b are sized so as to establish mutually facing channels between the frame members 50a,b and the seal plate 14 which receive the valve plate 12 such that the longitudinal outer marginal edges of the valve plate are captured between the frame members 50a,b and the seal plate while enabling longitudinal movement of the valve plate relative to the seal plate.

As aforementioned, the valve plate 12 is interconnected to the double acting fluid pressure cylinders 24 and 26 in a manner to enable selective longitudinal movement of the valve plate between a first position wherein the port 22 and associated convey line 20 are axially aligned with the discharge port 30, such as illustrated in FIGS. 1 and 3, and a second position wherein the convey line 20 is aligned with the circular discharge port 32 in the seal plate and its associated convey line 36. To this end, the cylinders 24 and 26 are suitably mounted in parallel relation on the end plate 52a in normal relation thereto such that their corresponding piston rods 24a and 26a extend through suitable openings in the support plate 52a and are interconnected to a connecting bar 66 through corresponding clevises 68a and 68b and connecting pins 70a and 70b. The connecting bar 66 is in turn connected to the corresponding end of the valve plate 12 as by screws 72.

Figure 5:
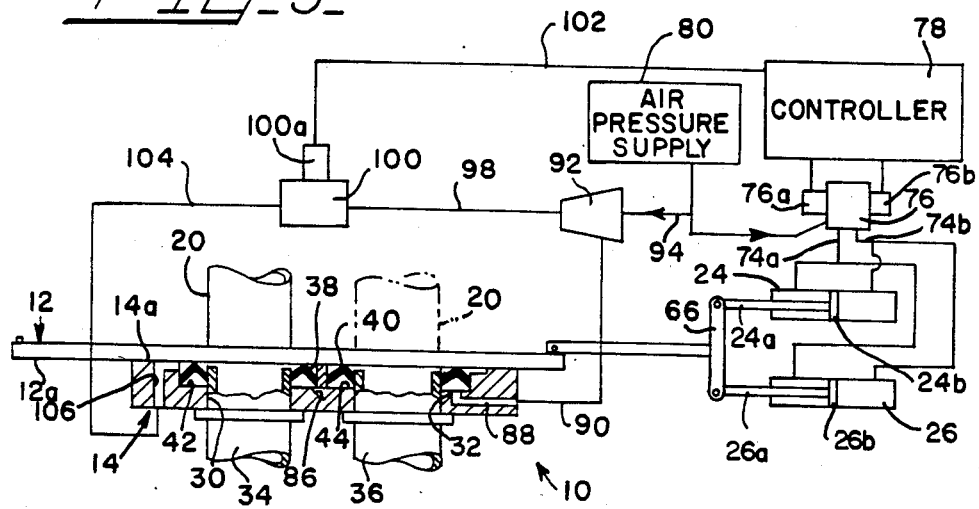
FIG. 5 is a schematic diagram illustrating a pneumatic control circuit operative to effect movement of the valve plate and seal rings of the diverter valve of FIG. 1.

To enable selective extension and retraction of the piston rods 24a and 26a of the actuating cylinders 24 and 26, and thereby effecting a corresponding movement of the valve plate 12, the actuating cylinders are connected in a fluid pressure control circuit such as illustrated schematically in FIG. 5. In the illustrated embodiment, the fluid pressure circuit comprises a pneumatic pressure system. Referring to FIG. 5, the corresponding piston and rod ends of the cylinders 24 and 26 are connected, respectively, through fluid pressure lines 74a and 74b to a four-way solenoid valve 76 having control solenoids 76a and 76b. The solenoid valve 76 is of a conventional type, such as commercially available from Automatic Switch Company, and has its solenoids 76a,b electrically connected to an electronic controller 78 which may take the form of an electrical sequencer of generally conventional construction which is adapted to receive external signals and condition the solenoid valve 76 to effect pneumatic pressure flow from an air pressure supply 80 to the piston or rod ends of the cylinders 24 and 26 and thereby effect selective movement of the valve plate between its alternate operating positions.

To enable the controller 78 to effect predetermined sequencing of the control valve 76 for movement of the valve plate 12, the actuating cylinders 24 and 26 are of the type wherein each of their associated pistons, indicated schematically at 24b and 26b, carries a magnet operative to close either of two normally open control switches in the form of reed switches (not shown) mounted at selected positions establishing the opposite ends of the stroke of the corresponding piston, the reed switches for each cylinder being electrically coupled to the controller 78. Such actuating cylinders are commercially available and provide signals to the controller 78 to facilitate sequencing of the various operating functions of the control circuit in relation to the position of the valve plate 12. The aforedescribed stops 48a,b and 48c,d on the valve plate 12 are located to abut the corresponding end plates 52a and 52b when the valve plate is in its alternate valve positions. The controller 78 and associated fluid pressure lines may be mounted on frame members 58a and 58b on the right-hand end of the support framework 16, as considered in FIG. 1.

As aforementioned, the annular seals 38 and 40 are supported by the seal plate 14 circumferentially about each of the seal plate ports 30 and 32 so as to seal against the opposing planar surface 12a of the valve plate 12 and prevent leakage of air and associated dust and the like during pneumatic conveying of material such as particulate or pulverulent materials from the convey line 20 through either of the convey lines 34 and 36. Referring to FIGS. 3 and 4, taken in conjunction with FIG. 5, each of the annular seals 38 and 40 preferably comprises an annular non-rigid and non-metallic seal made from neoprene rubber or a suitable plastic material and has a generally V-shaped transverse cross-section so as to establish generally parallel annular seal surfaces 38a,b and 40a,b, respectively, as illustrated in FIG. 4. The annular seal grooves 42 and 44 are defined, respectively, in part by upstanding annular surfaces 42a and 44a formed on the seal plate 14 (FIG. 4) and outer annular surfaces 34a and 36a formed on the tubular ends of the convey lines 34 and 36 received within the corresponding circular seal plate ports 30 and 32. In this manner, the annular seal edge surfaces 38a and 38b of seal 38 engage the annular surfaces 34a and 42a of seal groove 42, while the seal edge surfaces 40a and 40b of seal 40 engage the annular surfaces 36a and 44a of seal groove 44. The tubular convey lines or conduits 34 and 36 have radial flanges 34b and 36b which are of generally rectangular configuration similar to the flange 20a on the convey line 20 as illustrated in FIG. 1. The flanges 34b and 36b are affixed to the exposed surface 14b of the seal plate 14 by suitable means such as screws. The convey lines 34 and 36 are sized such that when mounted on the seal plate 14, end surfaces 34c and 36c, respectively, are slightly spaced from the opposing surface 12a of the valve plate 12 as shown in FIG. 4.

With the annular seals 38 and 40 positioned within their respective annular seal ring grooves 42 and 44 as aforedescribed, an annular chamber is established between the base of each seal ring groove and the associated annular seal. As illustrated in FIG. 4, the annular chambers underlying the seals 38 and 40 are interconnected in fluid pressure communication by a suitable passage 86 formed within the seal plate 14. The seal ring grooves 42 and 44 are connected in the aforementioned pneumatic control circuit through a flow passage 88 which is formed in the seal plate 14 so as to intersect seal groove 44 and is adapted for threaded connection to a fluid pressure conduit 90. The fluid pressure conduit 90 is connected to a venturi 92 which has an inlet port connected to the air supply 80 through a conduit 94. The downstream or outlet end of the venturi 92 is connected through a suitable conduit or pressure line 98 to a conventional 2-way solenoid valve 100 having an operating solenoid 100a connected to the controller 78 through a suitable electrical conductor such as illustrated schematically at 102. The other end of solenoid valve 100 is connected through a fluid pressure conduit 104 to a passage 106 formed in the seal plate 14 (FIGS. 1 and 2). The fluid pressure passage 106 communicates with an air passage or channel 108 of generally rectangular transverse cross-section formed in the surface 14a of the seal plate to facilitate air pressure passage to the seal ring grooves 42 and 44 through branches 108a and 108b, the branches 108a preferably intersecting the seal grooves 42 and 44 generally tangentially in the region above the corresponding seals 38 and 40.

In accordance with one feature of the diverter valve 10 and the associated pneumatic control circuit, control of air flow through the venturi 92 is operative to selectively pressurize the annular chambers below the annular seals 38 and 40 so as to bias the seals into sealing relation with the opposing surface 12a of the valve plate. Such fluid pressure biasing of the seals 38 and 40 against the valve plate is effected when the convey line 20 is aligned with either of the convey lines 34 and 36 during pneumatic conveying by closing the solenoid valve 100 such that air pressure flowing through the venturi is caused to pass through the flow conduit 90, air passage 88 and into the annular seal chambers 42 and 44 below the associated annular seals.

At such time as it is desired to divert material flow in convey line 20 to, for example, convey line 36 from convey line 34, an external control signal is applied to the controller 78 which effects opening of valve 100 such that air pressure flows through venturi 92, valve 100 and flow line 104 to the air passages 106 and 108 in the seal plate. Such fluid pressure flow through the venturi causes a vacuum to be drawn through line 90 and passages 88 and 86 to subject the seals 38 and 40 to sufficient vacuum to retract them from their sealing relation with the side valve. The controller 78 is adapted to automatically sequence retraction of the seals 38 and 40 from their sealing relation with the valve plate in predetermined timed relation with and prior to movement of the valve plate between positions wherein convey line 20 is shifted or diverted from one of the convey lines 34 or 36 to the other. In this manner, the annular seals 38 and 40 do not engage the valve plate during movement thereof, thus substantially reducing wear on the seal surfaces with resultant prolonged life of the seals. In the illustrated embodiment, the venturi 92 is preferably selected to apply fluid pressure at approximately 60-90 p.s.i. to the annular seal chambers 42 and 44 so as to bias the corresponding seals 38 and 40 into airtight sealing engagement with the valve plate when in either of its conveying positions with the convey lines 34 and 36, and is adapted to provide a minus 10 to minus 22 inch mercury vacuum to the annular chambers below the seals 38 and 40 so as to effect seal retraction during movement of the valve plate 12. It will be appreciated that the fluid pressure and vacuum values required to effect the desired sealing engagement and retraction of the seals 38 and 40 relative to the valve plate may vary depending on the selected size and geometry of the seal arrangement.

As aforementioned, with the valve 100 open to effect retraction of the seals 38 and 40, fluid pressure is introduced into the flow passage 106 and associated channel branches 108a and 108b in the seal plate so as to cause air pressure to flow circumferentially about the seal ring grooves 42 and 44 on the sealing surface sides of the seals. This air flow passes over the sealing surfaces of the retracted seals and is discharged into the convey lines 34 and 36 through the annular spaces between the ends 34c and 36c of the convey lines 34 and 36, respectively, and the opposed surface 12a of the valve plate whereby to effect air cleaning of the seals during retraction.

Summarizing the operation of the diverter valve 10 and associated pneumatic control circuit, and assuming mounting of the diverter valve in a pneumatic conveying system such that the convey line 20 receives incoming material, such as particulate material, the actuating cylinders 24 and 26 are operative to provide signals to the controller 78 indicating which of the two convey positions the valve plate 12 is in. Further assuming initial flow through outlet convey lines 34, at such time as it is desired to divert flow to outlet or downstream convey line 36, an external control signal, such as a signal from a material receiving reservoir indicating that its storage capacity has been reached, is applied to the controller 78 which automatically opened valve 100 to effect retraction of seals 38 and 40 and initiate air flow cleaning of the seals. Preferably, the external signal is also applied to a control valve (now shown) in the convey line upstream of tubular convey line 20, such as a control valve on a pressure tank adapted to draw particulate material from a cargo vessel or the like, so as to temporarily terminate particulate material flow to valve 10 while allowing continued air flow through line 20.

After retracting the seals 38 and 40, the controller 78 effects actuation of the cylnders 24 and 26 to transfer valve plate 12 to its opposite operating position where in the convey line 20 is aligned with the discharge convey line 36. The controller 78 is adapted to shift valve plate 12 to its diverting position a predetermined time, such as one second, after retraction of the seals 38 and 40. During seal retraction, air pressure flow over the seals effects cleaning thereof as aforedescribed. After shifting or transfer of the valve plate 12, the cylinders 24 and 26 signal the controller 78 that valve plate movement has been completed whereupon the controller causes valve 100 to close. Closing valve 100 causes air pressure to be applied to the seals 38 and 40 to bias them into airtight sealing engagement with the valve plate and thereby seal about the ports 30 and 32 during material flow therethrough. Shifting or transfer of the valve plate 12 in a reverse direction is effected by the controller in a similar manner.

It will be appreciated that while the diverter valve 10 has been described in conjunction with conveying particulate material, the diverter valve may find application in substantially any pneumatic conveying system where it is desired to provide for diverting of the conveyed product or article from one to another of a plurality of convey lines downstream from the diverter valve. Similarly, by eliminating the port 32 in the seal plate 14, the diverter valve 10 could be employed to divert flow from a convey condition, such as through aligned ports 22 and 30, to a non-convey condition where the valve plate port 22 would be closed off by the seal plate to totally block flow through valve 10.

While a preferred embodiment of the present invention has been illustrated and described, it will be understood that changes and modifications may be made therein without departing from the invention in its broader aspects. Various features of the invention are defined in the following claims.

What is claimed is:

1. A diverter valve arrangement comprising, in combination, a first plate having at least one substantially planar surface defining a port therethrough, a second plate having at least one substantially planar surface and defining at least two ports therethrough, means supporting said first and second plates such that their said substantially planar surfaces are in juxtaposed relation while enabling relative movement between first positions wherein said first plate port is in aligned relation with one of said second plate ports and second positions wherein said first plate port is in aligned relation with the other of said second plate ports, means for effecting selective relative movement of said first and second plates between said first and second positions, an annular seal carried by said second plate circumferentially about each of said ports therethrough, each of said seals having a sealing surface and being adapted for movement between a first position effecting sealed relation of its sealing surface with said first plate and a second position spaced from said first plate, and fluid pressure control means operatively associated with each of said seals in a manner to effect movement between their said first and second positions, said pressure control means including a venturi defining a fluid pressure inlet adapted for connection to a source of fluid pressure, a venturi port operatively connected with said seals in a manner to effect selective movement thereof between their said first and second positions, and an outlet port connected in fluid pressure communication with said sealing surfaces so as to enable flow of fluid pressure across said sealing surfaces when in their said second positions to effect cleaning of said sealing surfaces, said fluid pressure control means further including a control valve connected to said outlet port and being adapted in a first mode to prevent fluid pressure flow from said outlet port and cause movement of said seals to their said first positions, said control valve being adapted in a second mode to subject said seals to vacuum so as to move them to their said second positions while substantially simultaneously effecting fluid pressure flow through said outlet port to effect cleaning of said sealing surfaces when in their said second positions.

2. A diverter valve arrangement as defined in claim 1 wherein one of said first and second plates defines a valve plate, and the other of said first and second plates defines a seal plate, said seals being operatively associated with said seal plate circumferentially of the corresponding ports therethrough, said means for effecting selective movement of said first and second plates including fluid pressure cylinder means operative to effect movement of said valve plate relative to said seal plate.

3. A diverter valve arrangement as defined in claim 1 wherein said fluid pressure control means is operatively associated with said seal plate in a manner to effect movement of said seals into sealing relation with said valve plate in response to the position of said valve plate relative to said seal plate, said control means being operative to effect retraction movement of said seals during movement of said valve plate relative to said seal plate.

4. A diverter valve arrangement as defined in claim 1 wherein said fluid pressure control means is operative to effect simultaneous movement of said annular seals between said sealing and retracted positions relative to said valve plate.

5. A diverter valve arrangement as defined in claim 1 wherein said fluid pressure control means is operative to detect the position of said valve plate relative to said seal plate, said control means being operative to prevent sealing engagement of said seals with said valve plate during movement of said valve plate between its said first and second positions.

6. A diverter valve arrangement as defined in claim 5 wherein said control means is operative to delay movement of said valve plate relative to said seal plate after initiating retraction of said annular seal.

7. A diverter valve arrangement as defined in claim 1 wherein said seal plate has an annular seal groove formed therein circumferentially of each of said ports, said annular seals being disposed within said seal grooves, said venturi being in fluid pressure communication with each of said seal grooves and operative in said first mode of said control valve to apply fluid pressure to both of said seals so as to effect movement of said seals to their said first positions, said venturi being operative in said second mode of said control valve to apply negative pressure to said annular seals so as to effect retraction thereof from said valve plate.

8. A diverter valve arrangement as defined in claim 1 wherein said fluid pressure control means is adapted to effect said relative movement of said valve and seal plates between said first and second conditions a predetermined time delay after retraction of said seals.

9. A diverter valve arrangement as defined in claim 1 wherein each of said seals comprises a non-rigid non-metallic annular seal which is disposed within a corresponding annular seal groove formed in the seal plate circumferentially about an associated outlet port.

10. A diverter valve arrangement as defined in claim 9 wherein said annular seals are substantially V-shape in transverse cross section and positioned so as to establish generally line sealing contact with said valve plate.

11. A diverter valve arrangement for use in a pneumatic conveying system and the like comprising, in combination;
 a valve plate having a convey conduit operatively associated therewith and defining a port enabling passage of material through said valve plate,
 a seal plate having at least two ports therethrough adapted for connection to convey lines,
 means supporting said valve plate and seal plate in juxtaposed relation so as to enable relative movement therebetween between a first condition wherein said valve plate port is in flow communication with one of said seal plate ports to facilitate flow therethrough and a second condition wherein flow is diverted to the other of said seal plate ports,
 means operatively associated with said valve and seal plates in a manner to enable selective relative movement thereof between said first and second conditions,
 an annular seal carried by said seal plate about each of said ports therethrough, each of said seals having a sealing surface and being adapted for movement between a first position effecting sealed relation of its sealing surface with said valve plate and a second position spaced from said valve plate,
 and fluid pressure control means operatively associated with each of said seals in a manner to effect movement thereof between their said first and second positions, said pressure control means including a venturi defining a fluid pressure inlet adapted for connection to a source of fluid pressure, a venturi port operatively connected with said seals in a manner to effect selective movement thereof between their said first and second positions, and an outlet port connected in fluid pressure communication with said sealing surface so as to enable flow of fluid pressure across the sealing surfaces when in their said second positions to effect cleaning of said sealing surfaces,
 said fluid pressure control means further including a control valve connected to said venturi outlet port and being adapted in a first mode to prevent fluid pressure flow from said outlet port so as to cause movement of said seals to their said first positions, said control valve being adapted in a second mode to effect fluid pressure flow from said outlet port so as to subject said seals to vacuum and cause movement thereof to their said second positions while substantially simultaneously causing said fluid pressure flow from said outlet port to clean said sealing surfaces when in their said second positions.

* * * * *